United States Patent
Klug

(10) Patent No.: US 9,542,957 B2
(45) Date of Patent: Jan. 10, 2017

(54) PROCEDURE AND MECHANISM FOR CONTROLLING AND USING VOICE COMMUNICATION

(71) Applicant: Unify GmbH & Co. KG, Munich (DE)

(72) Inventor: Karl Klug, Miesbach (DE)

(73) Assignee: Unify GmbH & Co., KG, Munich (DE)

( * ) Notice: Subject to any disclaimer, the term of this patent is extended or adjusted under 35 U.S.C. 154(b) by 99 days.

(21) Appl. No.: 14/223,159

(22) Filed: Mar. 24, 2014

(65) Prior Publication Data
US 2014/0288927 A1    Sep. 25, 2014

(30) Foreign Application Priority Data
Mar. 22, 2013 (DE) .................. 10 2013 005 049

(51) Int. Cl.
| | |
|---|---|
| *G10L 21/00* | (2013.01) |
| *G10L 21/0208* | (2013.01) |
| *H04B 3/20* | (2006.01) |
| *H04M 1/58* | (2006.01) |
| *H04M 3/56* | (2006.01) |
| *H04M 9/08* | (2006.01) |

(Continued)

(52) U.S. Cl.
CPC ........... *G10L 21/0208* (2013.01); *H04B 3/20* (2013.01); *H04M 1/585* (2013.01); *H04M 3/568* (2013.01); *H04M 9/082* (2013.01); *G10L 2021/02082* (2013.01); *G10L 2021/02165* (2013.01); *H04R 1/1083* (2013.01); *H04R 2201/107* (2013.01); *H04R 2410/05* (2013.01); *H04R 2410/07* (2013.01); *H04R 2460/01* (2013.01)

(58) Field of Classification Search
CPC .................. G10L 21/0208; H04R 2410/05
See application file for complete search history.

(56) References Cited

U.S. PATENT DOCUMENTS 4,212,119 A * 7/1980 Tomatis ................. 434/156
4,577,071 A    3/1986 Johnston et al.
(Continued)

FOREIGN PATENT DOCUMENTS

| | | |
|---|---|---|
| EP | 1830348 A1 | 9/2007 |
| WO | 99/11045 | 3/1999 |

(Continued)

*Primary Examiner* — Marivelisse Santiago Cordero
*Assistant Examiner* — Kevin Ky
(74) *Attorney, Agent, or Firm* — Buchanan Ingersoll & Rooney PC

(57) ABSTRACT

In a method and system for controlling voice communication of a first person with at least a second person via a communication network a first microphone receives and converts vocal utterances from the first person to a voice signal. A first processor generates a transmission signal by processing the voice signal. A transmitter sends the transmission signal to a receiver. The receiver generates a listening signal by processing the received signal and transmits the listening signal to a speaker. The speaker converts the listening signal to an acoustic signal to be perceived by the first person. In this method a second processor generates the listening signal from the received signal by branching the voice signal and adding the branched voice signal to the received signal. The branched voice signal may be subjected to variable attenuation and/or amplification before being added to the branched voice signal to the received signal.

19 Claims, 5 Drawing Sheets

(51) Int. Cl.
*H04R 1/10* (2006.01)
*G10L 21/0216* (2013.01)

(56) References Cited

U.S. PATENT DOCUMENTS

| | | | |
|---|---|---|---|
| 5,602,962 A * | 2/1997 | Kellermann | H04R 1/406 381/92 |
| 5,686,684 A * | 11/1997 | Nagata | G10H 1/366 434/307 A |
| 5,825,897 A | 10/1998 | Andrea et al. | |
| 6,166,315 A * | 12/2000 | Kitano | G09B 15/00 381/63 |
| 7,769,187 B1 | 8/2010 | Farrar et al. | |
| 7,881,927 B1 | 2/2011 | Reuss | |
| 8,050,398 B1 | 11/2011 | Xu | |
| 2003/0228023 A1 | 12/2003 | Burnett et al. | |
| 2004/0052358 A1 | 3/2004 | Laskley et al. | |
| 2004/0179676 A1 | 9/2004 | Okuda et al. | |
| 2005/0175185 A1 * | 8/2005 | Korner | G10L 21/038 381/61 |
| 2006/0282184 A1 * | 12/2006 | Elias | H04M 11/066 700/94 |
| 2007/0053505 A1 | 3/2007 | Houghton | |
| 2007/0238490 A1 | 10/2007 | Myrberg et al. | |
| 2007/0263847 A1 | 11/2007 | Konchitsky | |
| 2008/0147397 A1 * | 6/2008 | Konig | G10L 21/02 704/246 |
| 2008/0298577 A1 | 12/2008 | Mohl et al. | |
| 2009/0136063 A1 * | 5/2009 | Xiang | H04S 7/30 381/119 |
| 2010/0020940 A1 | 1/2010 | Zad-Issa et al. | |
| 2010/0022280 A1 | 1/2010 | Schrage | |
| 2010/0322430 A1 | 12/2010 | Isberg | |
| 2011/0293103 A1 | 12/2011 | Park et al. | |
| 2012/0020485 A1 | 1/2012 | Visser et al. | |
| 2012/0281854 A1 * | 11/2012 | Ishibashi | 381/92 |
| 2014/0177871 A1 * | 6/2014 | Morton | H04R 3/04 381/99 |

FOREIGN PATENT DOCUMENTS

| | | |
|---|---|---|
| WO | 9911047 A1 | 3/1999 |
| WO | 00/11047 | 3/2000 |

* cited by examiner

PROCEDURE AND MECHANISM FOR CONTROLLING AND USING VOICE COMMUNICATION

FIELD OF INVENTION

This invention concerns a procedure and a mechanism to control voice communication, and to use voice communication for teleconferencing, for headphones/earphones or a headset.

BACKGROUND OF THE INVENTION

For voice communication procedures like teleconferencing/videoconferencing when also using a headset with cellular phones or the like, voice quality is an important design criterion.

If conference participants are located in a loud environment, this can disrupt the conference. This can happen if the participant is taking part in the conference using a cell phone in public, but participants using a headset in a conference environment can also be affected. On the one hand, the participants in the loud environment find it more difficult to understand the content of the conference; on the other hand, the ambient noise is transmitted to the other conference participants. In addition, the participants in the loud environment cannot hear their own voices well, which makes them have to speak louder to overcome the ambient noise. This can cause at least two other disadvantages. For one, speaking louder can result in additional noise, which can be disruptive at the location of the other participant, e.g., in an open-plan office (in an environment with many conference participants, this can also result in everyone attempting to speak louder than the others, and the noise level building up accordingly). For another, it is difficult to discuss confidential and/or commercial matters in publicly accessible buildings or publicly accessible locations, since basically anyone in the vicinity can listen in. The participant's auditory impression can also be disrupted if the speaker's own voice is played back to him or her out of the conference system with a certain delay (i.e., "round trip delay"). Echo and hall effects can be created, for example, if the voice signal is output by the conference system via a speaker and picked up by a microphone (acoustic echo), or if signals are simultaneously sent and received by telecommunication equipment (duplex echo). An echo and the resulting disruption gets stronger the louder the participant speaks.

To minimize the disruption caused to other participants by a participant speaking too loud, it is common for a conference moderator or the participant to manually lower the sound level of the line with the loud environment (i.e., "muting"). This is often a repetitive procedure, and it might have to be adjusted multiple times or constantly.

To handle disruptive ambient noise, it is common, e.g., for teleconferencing, to output to the ear's speaker the ambient noise phase shifted by 180° in addition to the conference signal. This cancels out the ambient noise for the ear. Similar solutions have also been developed for listening to music on a plane or in a train car, or for aircraft or helicopter pilot headsets. In the best case, the environment can barely be heard. However, the participant's voice can also barely be heard, since this type of headset often fits very tightly against the ear and is designed to be soundproof. To hear himself or herself, the participant again attempts to speak very loudly, which leads to the disadvantages described above.

As described, ambient noise can also be picked up by a participant's voice microphone and transmitted via the conference system or a telephone system to other participants. A solution to this problem has already been developed for headsets in the mobile communications field, using two directional microphones, for example, arranged in opposite directions (toward the mouth/away from the mouth). The signal-to-noise ratio of the transmission signal is also improved there by compensating for the ambient noise. In this case, the other participants no longer hear the background noise as loudly. However, the participant is still subjected to the loud environment, and the other participants cannot tell that the speaker is speaking so loudly to overcome the ambient noise, and that this person may still have problems following along with the conference due to disruption from the loud ambient noise.

There is also another problem with a headset. Many headsets are designed for the earpiece to form a soundproof seal to block out the ambient noise. This also makes it necessary to remove the headset to interact with one's surroundings. The headset is also disruptively large. This means that a compromise must be made to acoustically seal the earpiece so the desired signal does not have to be amplified very strongly, since this amplification is energy-intensive and comes at a cost of battery life. In addition, it is also common here to output the ambient noise with a 180° phase shift, i.e., inverted, which causes the ear to cancel out the ambient noise.

SUMMARY OF THE INVENTION

A function of this invention is to improve voice communication when a speaker is influenced by ambient noise, both for the speaker as well as for the other communication participants.

The function is achieved with the characteristics of the independent claims. Advantageous refinements and preferred embodiments of the invention are specified in the subclaims.

One factor of this invention is a proposed procedure for controlling voice communication between a first person with at least a second person via a communication network, whereupon the procedure includes the following steps:

Receiving the voice signal from a first microphone, which is developed to convert vocal utterances from the first person, Generating a transmission signal by processing the voice signal, Transmitting the transmission signal to the communication network, Receiving a received signal from the communication network, Generating a listening signal by processing the received signal, and Transmitting the listening signal to a speaker that is developed to convert the listening signal to an acoustic signal to be perceived by the first person, whereupon the processing of the received signal to generate the listening signal includes the following steps:

Branching the voice signal, and

Adding the branched voice signal to the received signal, whereupon the branched voice signal is subjected to a preferably variable attenuation and/or amplification before the addition.

For the purposes of the invention, a microphone is considered any sound-to-signal converter. The voice signal generated using the first microphone reflects utterances from the first person. For the purposes of the invention, transmitting and receiving can be considered both transmitting communications with transmitting and receiving devices as well as coupling signals or line link circuitry. For the purposes of the invention, a communication network can be, but is not limited to, a wired telephone network, a cellular telephone network or another type of radio network, suitable building cabling, a central conference server, etc. For the purposes of the invention, a speaker can be considered any signal-to-sound converter, particularly a headset, earphones, headphones, an in-ear speaker device, etc. The signal processing can be analog or digital, and can use wired circuitry or software-based methods. Variable attenuation or amplification is considered a (frequency-dependent or frequency-independent) decrease or increase in gain through automatic means or manually by a person, particularly the first person. In addition, for the purposes of the invention, branching is considered the forking of a signal path of a physical circuit arrangement or generating a copy of a digital representation of the voice signal. Preferably, the voice signal will be branched as it is received. Alternately, the voice signal can also be branched after any of the processing steps in a processing path between receiving the voice signal and transmitting the transmission signal.

If the first person's voice signal is added to the listening signal, the speaker will be able to hear himself or herself. This allows the speaker to speak more quietly, and also establish a certain amount of confidentiality for the conversation, even if the discussion is taking place in public. The environment is disrupted less by the discussion. In addition, conference participants or telephone conversation partners with the first person will no longer be irritated by the first person speaking too loudly. Variability of attenuation and amplification characteristics can also be used to reach a comfortable balance between the received signal and the voice signal.

Preferably, the processing of the received signal to generate the listening signal in the procedure according to the invention includes the following steps:

Branching the transmission signal,

Subjecting the branched transmission signal to a preferably variable echo compensation to generate an echo compensation signal matching an anticipated echo of the transmission signal contained in the received signal, and Subtracting the echo compensation signal from the received signal.

For the purposes of the invention, subtracting a signal can also be considered adding the inverted signal, i.e. the signal phase-shifted by 180°. The echo compensation signal is achieved, for example, by applying a delay and attenuation with preset, configurable, or automatically adjustable parameters, like delay time and attenuation factor, in particular. This can reduce acoustic or device-related echo effects.

An advantageous refinement of the procedure according to the invention includes the following step:

Receiving a general ambient signal from a second microphone that is arranged in an environment where the first person is located, and exhibits different sound acceptance characteristics than the first microphone, particularly its sound acceptance direction, whereupon the processing of the voice signal to generate the transmission signal includes the following step:

Subtracting the general ambient signal from the voice signal, whereupon the general ambient signal is subjected to preferably variable attenuation before the subtraction.

For the purposes of the invention, an ambient signal reflects an acoustic signal or a noise signal of an environment where the first person is located. For the purposes of the invention, the characterization as a general ambient signal conveys that the ambient signal reflects a noise level prevailing in the environment of the first person without being linked to a specific location. The second microphone can therefore be structurally combined with the first microphone, or structurally separate from the first microphone. In any event, the second microphone is a separate sound-to-signal converter. By subtracting the ambient signal from the voice signal of the first person, ambient noise can effectively be filtered out of the transmission signal. The signal-to-noise ratio of the transmission signal improves. Other communication partners, like any conference participants or telephone partners are no longer disrupted by the noise in an environment where the first person is located. To receive a faithful auditory impression, the ambient noise can only be filtered in part, so that a small portion of the ambient noise is transmitted along and the conversation partner can also adapt to the situation of the first person. The variable attenuation is preferably adjusted automatically by a control unit or manually by the first person. It is also conceivable that the variable attenuation could also be adjusted at an external location like a conference server or the like, if the procedure is used in a conference system.

In a preferred embodiment of the procedure according to the invention, the processing of the received signal to generate the listening signal includes the following steps:

Branching the general ambient signal, and

Subtracting the branched general ambient signal from the received signal, whereupon the branched general ambient signal is subjected to preferably variable attenuation before the subtraction.

In this way, the first person is shielded from ambient noise by phase-shifting the general ambient signal by 180° and playing it with the listening signal. The noise perceived from the environment and the inverted ambient signal more or less cancel each other out at the ear of the first person, i.e., where the speaker is located. Also here, the cancellation can be limited to a certain degree, so the first person does not completely lose contact with the environment. This can be important, particularly in traffic or other safety-related situations like in a machine environment, or generally to ensure a realistic perception of the situation.

In this embodiment, the voice signal and the general ambient signal are preferably generated at essentially the same location, preferably in the vicinity of the first person's mouth, with different sound acceptance directions for the first microphone and the second microphone. In other words, the voice signal and the general ambient signal should be generated such that the first microphone records voice signals emitted by the first person's organ of speech together with the ambient sound, while the second microphone converts ambient noise—fading out or shielding the speech sound to the greatest extent possible—to the general ambient signal, whereupon the ambient noise essentially does not contain the first person's voice.

Another preferred embodiment of the procedure according to the invention includes the following step:

Receiving a specific ambient signal from a third microphone, which is in the vicinity of the first person's ear, particularly closer to the first person's ear than the second microphone, whereupon the processing of the received signal to generate the listening signal includes the following step:

Subtracting the specific ambient signal from the received signal, whereupon the specific ambient signal is subjected to preferably variable attenuation before the subtraction.

By using a specific ambient signal in the vicinity of the first person's ear, the procedure can differentiate between an ambient sound that prevails at a playback location of the speaker, i.e., the first person's ear, and ambient sound conditions at the voice recording location where the first microphone records the first person's voice sound. This can separately optimize an additive fading out of the ambient sound by adding an inverted or 180° phase-shifted ambient signal both for the second person receiving the transmission signal and for the first persons receiving the listening signal.

For this embodiment, the listening signal and the specific ambient signal are preferably generated at essentially the same location through the speaker/the third microphone, whereupon the sound acceptance direction for the third microphone preferably corresponds essentially with the sound emission direction of the speaker. Ideally, the sound acceptance characteristics of the third microphone match the sound acceptance characteristics of the human ear as closely as possible. This allows the shielding of one of the first person's ears from ambient noise to be particularly effective so that the received signal and the first person's own voice signal can be played back with optimal comprehensibility at the location of the speaker, after suitable attenuation of the ambient noise prevailing at the ear.

In a particularly preferred refinement of the invention, the received signal is processed for each of the first person's ears separately according to the procedure described above such that:

The speaker includes a first speaker assigned to the first ear of the first person, and a second speaker assigned to the second ear of the first person.

The listening signal includes a first listening signal to transmit to the first speaker, and a second listening signal to transmit to the second speaker.

The third microphone includes a first third microphone and a second third microphone.

The specific ambient signal includes a first specific ambient signal generated by the first third microphone, and a second specific ambient signal generated by the second third microphone.

The first specific ambient signal is preferably variably attenuated and subtracted from the received signal to generate the first listening signal, while the second specific ambient signal is preferably variably attenuated and subtracted from the received signal to generate the second listening signal.

In other words, this embodiment is designed so the listening signal is generated in two channels, i.e., in stereo. Since each ear receives a specific ambient signal, and the respective listening signal is played back inverted, the ambient noise can be faded out optimally for each ear. This allows, for example, a loud conversation taking place predominantly on one side of the first person to be faded out specifically on this side, while a background noise like a busy street that is predominantly on the other side of the first person can be faded out specifically on this side.

According to another factor, a procedure can be declared to process a received signal to play back in a first channel and a second channel via a headphone device, whereupon each channel is assigned to one side of the headphone device, whereupon the procedure includes the following steps:

Receiving a received signal,

Processing a received signal to a first listening signal assigned to the first channel, and a second listening signal assigned to the second channel, and Transmitting the first listening signal to a first speaker of the headphone device, and a second listening signal to a second speaker of the headphone device, whereupon the step of processing the received signal to generate the listening signal includes the following steps:

Receiving a first ambient signal from a first microphone that is designed to be in the vicinity of the first speaker or structurally combined with it, and a second ambient signal from a second microphone that is designed to be in the vicinity of the second speaker or structurally combined with it, and Subtracting the first ambient signal from the received signal in a processing path to generate the first listening signal, and subtracting the second ambient signal from the received signal in a processing path to generate the second listening signal, whereupon the first and the second ambient signals are subjected to preferably variable attenuation before the subtraction.

This can include processing a voice signal recorded by another microphone to generate a transmission signal to be transmitted on a communication network, whereupon the processing of the voice signal includes the following steps:

Branching the first and/or the second ambient signal, and

Subtracting the branched first and/or second ambient signal from the voice signal, whereupon the first and/or second ambient signal is/are subjected to preferably variable attenuation before the subtraction.

Using the first and/or second ambient signal generated at the speakers of the headphone device makes it possible to forgo the use of another microphone to capture the general ambient sound. The voice signal can then also be received by the communication network such that the audio play back procedure according to this factor can also be used as a procedure to control voice communication.

In all of the previously described embodiments of the invention, the processing of the voice signal to generate the transmission signal can include automatic gain adjustment/control.

Depending on the type of the transmission of the received signal, perhaps if the two channels are modulated or duplexed into a single carrier signal, it may be necessary to split (separate) the received signal into two listening channels. However, the received signal can also be received in two channels, perhaps at two different frequencies or via separate cables or cable wires, whereupon the received signal of the first channel is processed to generate the first listening signal, while the received signal of the second channel is used to process the second listening signal.

Another embodiment of the invention provides a mechanism to control voice communication, whereupon the mechanism is designed and equipped to execute the procedure described above. The function of this invention is solved by this mechanism for the same reasons as specified above for the procedure according to the invention. The equipment to execute the procedure can, for example, take the form of an appropriately programmed computing unit, or appropriately designed and wired hardware.

According to another embodiment of this invention, the mechanism described above is used for a speaking/listening unit that is selected from the group including at least a radiotelephone helmet, a headset, a concealed headset, an earphone alongside a separate microphone, an ear speaker in terms of a hearing device, and a microphone/earphone arrangement in a conference setting, whereupon the mechanism is integrated into or separate from the speaking/listening unit.

The invention can also be embodied by a computer program, including program commands that cause a computer to execute the steps of the described procedure when the computer program is loaded on the computer or executed by it. The procedure according to the invention can also be embodied by a software product that is stored on a medium that can be read by a computer, and that preferably can be loaded directly into the internal memory of a computer, and includes the program code to perform the steps of the described procedure when the computer program is executed on the computer. Furthermore, the invention can be embodied by a digital storage medium with electrically readable control signals that can work with a programmable computer to manage communication processes, whereupon the control signals are configured and modified to prompt the computer to execute the steps of the described procedure.

Other characteristics, functions, advantages, and details of this invention will be made even clearer in the description below with concrete exemplary embodiments and their graphical representation in the included figures. It is recognized that characteristics, features, advantages, and details of individual exemplary embodiments are transferable, and should also be considered disclosed in relation to the other exemplary embodiments, as long as they are not clearly groundless for technical or physical reasons. Exemplary embodiments can be combined with one another, and the combination can also be considered an exemplary embodiment of the invention.

In the following, the invention is described in more detail using preferred exemplary embodiments and with the help of the accompanying figures.

The figures are schematic and are not necessarily true to scale. The drawings and descriptions of them are only intended to be exemplary demonstrations of the principle of the invention, and they should not limit it in any way.

DESCRIPTION OF THE PREFERRED EMBODIMENT

Figure 1:
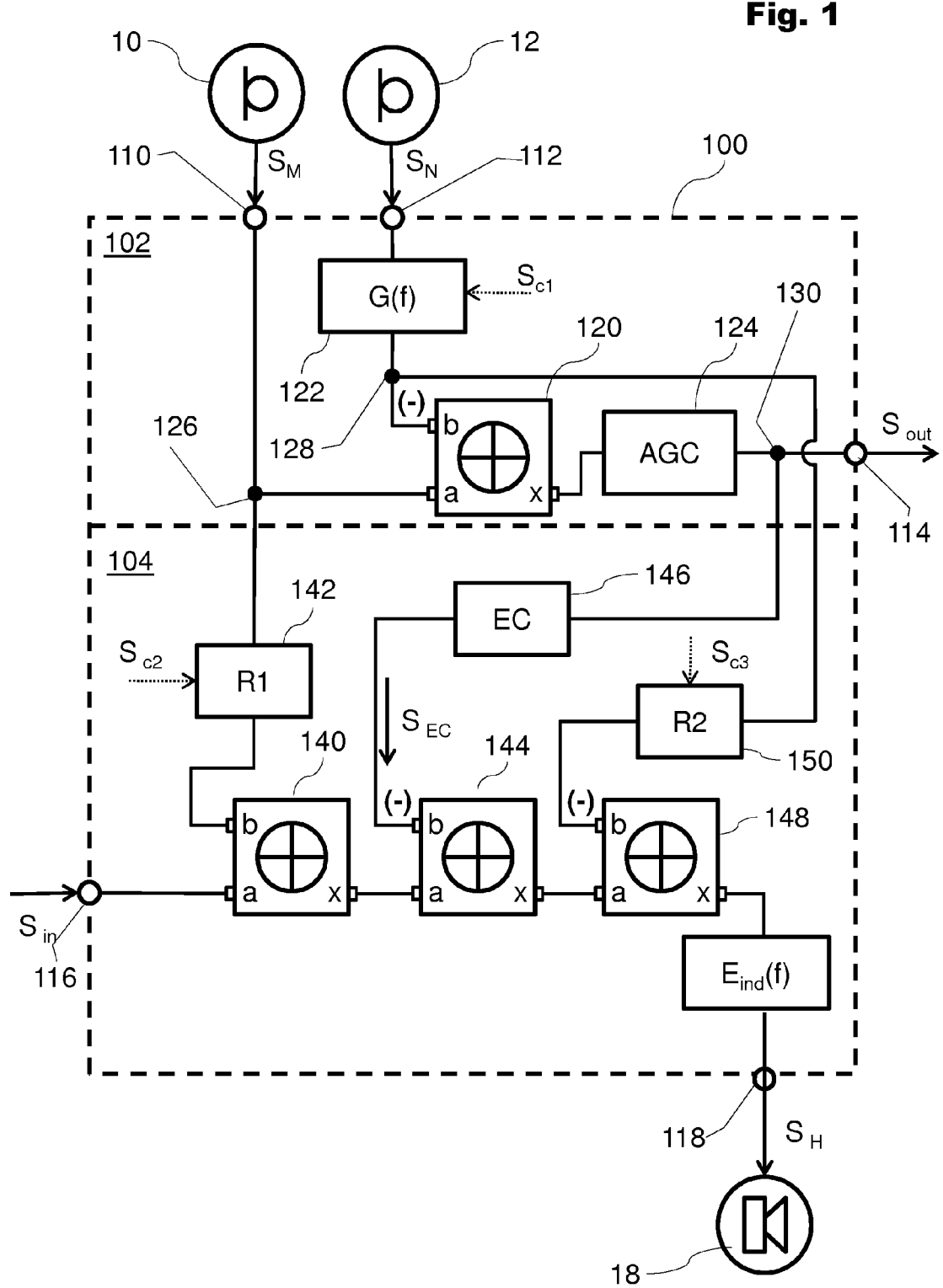
FIG. 1 is a block diagram to illustrate the signal flows and signal processing steps according to a first exemplary embodiment of this invention.

A first exemplary embodiment of this invention is illustrated in FIG. 1 in the form of a block diagram of signal flows and signal processing steps. According to the diagram in FIG. 1, a signal processing block 100 has a transmitting end 102 and a receiving end 104. On the transmitting end 102, a voice signal $S_M$ generated by a voice microphone 10 is fed to a microphone input 110, and an ambient signal $S_N$ generated by an ambient microphone 12 is fed to a microphone input 112, while a transmission signal $S_{out}$ is available at a transmission signal output 114. On the receiving end 104, a received signal $S_{in}$ is received via a received signal input 116, and a listening signal $S_H$ is available at a speaker output 118, which is fed to a speaker 18. The microphone input 110 can also be considered a voice microphone input 110 or a voice signal input 110; the microphone input 112 can also be considered an ambient microphone input 110 or an ambient signal input 110; and the speaker output 118 can also be considered a listening signal output 118. The ambient signal $S_N$ can also be considered a noise signal in relation to the voice signal $S_M$.

On the transmitting end 102, the voice signal $S_M$ received at the microphone input 110 is passed through a branching point 126 described further below, and afterwards is fed to an input a of an adder 120. Along with the input a, the adder 120 also has a negative (inverted) input b. This means the signal present at the negative input b is inverted before an addition, i.e., the phase is shifted by 180°. An adder with a negative input can also be considered a subtractor. The negative input b of the adder 120 is connected to an output of an attenuator 122.

The attenuator 122 receives the ambient signal $S_N$ received at the microphone input 112 as an input signal. The attenuator 122 subjects the ambient signal $S_N$ to an attenuation function G(f). G(f) is a frequency-dependent attenuation function $G(f)=A_x*E(f)$, where E(f) represents a (listening-/voice-/audio-)frequency-dependent equalization function (equalizer, frequency-response distortion) that can also be programmable, and $A_x$ represents an attenuation that is constant with regard to the frequency and configurable by at least one variable "x." G(f) is a combination of frequency response predistortion and a constant attenuation, and there can also be a frequency range with amplification as negative attenuation overall. The attenuation function G(f) can be used on the input signal, e.g., the ambient signal $S_N$, to improve intelligibility of speech and balance the room conditions. The characteristics of the attenuation function G(f) can be influenced by the control signal $S_{c1}$ that can be fed in from the outside. This makes an attenuated ambient signal $S_N \times G(f)$ available at the output of the attenuator 122.

The attenuated ambient signal is passed through a branching point 128 described further below, and afterwards is fed to a negative input b of the adder 120. After the addition of the inputs a, b in the adder 120, an environment-compensated voice signal $S_M - S_N \times G(f)$ is present at its output x, which is then subjected to another Automatic Gain Control (AGC) 124, and fed to the transmission signal output 114 as the transmission signal $S_{out}$ after being passed through a branching point 130 described further below. According to the above description, the transmission signal $S_{out}$ can be expressed with the following formula:

$$S_{out}=AGC(S_M-S_N \times G(f))$$

The transmission signal output 114 is also an interface with a communication network (not shown in detail here) to transmit the transmission signal $S_{out}$.

On the receiving end 104, the received signal $S_{in}$ received from the communication network via the received signal input 116 is processed in three adders 140, 144, and 148, and then fed to the speaker output 118 as the listening signal $S_H$ as described in more detail below. The received signal $S_{in}$, after being processed in the three adders 140, 144, and 148, is fed to the equalizer E(f), whereupon the output of the equalizer is fed to the speaker output 118. The equalizer can be designed to be ear-specific, whereupon a custom user hearing impairment, e.g., a hearing impairment of a person wearing a hearing aid, or another type of hearing impairment (loss of hearing sensitivity in higher frequency ranges, e.g., due to age, after an accident, etc., chronic hearing damage from listening to music too loudly as a child) can be balanced with this equalizer to improve the intelligibility of speech. To balance a user-specific hearing impairment, the equalizer function E(f) can be defined by measuring the hearing spectrum of the user, called "calibrating" in short. The calibration can be conducted as with adjusting a hearing aid. Alternately, preset frequency responses/frequency-response curves are conceivable, where the user could select at least one.

First, the received signal $S_{in}$ received at the received signal input 116 is fed to a first input a of the adder 140. The adder 140 has two positive inputs a, b. The second input b of the adder 140 is connected to an output signal of an attenuator 142.

The attenuator 142 receives the microphone signal $S_M$ tapped (branched) at the branching point 126 on the transmitting end 102, and subjects it to an attenuation factor $R_1$ that can be influenced by a control signal $S_{c2}$ that can be fed in from the outside. In other words, an attenuated voice signal $S_M \times R_1$ is present at the output of the attenuator 142.

The attenuated voice signal is fed to the second input b of the adder 140, and added to the received signal $S_{in}$ present at the first input a. There is then an addition signal $S_{in}+S_M \times R_1$ present at the output x of the adder 140.

The addition signal is fed to the first input a of the next adder 144. The second input b of the adder 144 is a negative input that is connected to an output of an echo compensator (EC) 146.

The echo compensator 146 receives the transmission signal $S_{out}$ tapped (branched) at the branching point 130 on the transmitting end 102, and processes it so that an echo compensation signal $S_{EC}$ output as the result corresponds to an anticipated echo of the transmission signal $S_{out}$ in the received signal $S_{in}$. To do this the echo compensator 146 subjects the tapped transmission signal $S_{out}$ to a preset delay and attenuation, as is already known by itself in the art.

The echo compensation signal $S_{EC}$ output from the echo compensator 146 is fed to the negative input b of the adder 144, and subtracted from the addition signal present at the positive input a. Accordingly, there is an echo-compensated addition signal $S_{in}+S_M \times R_1-EC(S_{out})$ present at the output x of the adder 144.

The echo-compensated addition signal is fed to the input a of the last adder 148. The second input b of the adder 148 is again a negative input that is connected to an output of another attenuator 150.

The attenuator 150 receives the attenuated ambient signal $S_N \times G(f)$ tapped at the branching point 128 on the transmitting end 102, and subjects it to an attenuation factor $R_2$. The attenuation factor $R_2$ can be influenced by a control signal $S_{c3}$ that can be fed in from the outside. The now twice attenuated ambient signal $S_N \times G(f) \times R_2$ is fed to the negative input b of the adder 148, and subtracted from the echo-compensated addition signal present at the positive input a. Therefore, a signal is present at the output x of the adder 148 that can then optionally be fed to an equalizer $E_{ind}(f)$ that is customized to the hearing of the user/headset wearer to balance out any hearing impairment on the part of the user. The output of the optional equalizer or the output 148 is then fed as the listening signal $S_H$ to the speaker output 118.

According to the above description, the listening signal $S_H$ can be expressed with the following formula:

$$S_H = E_{ind}(f) \times (S_{in} + S_M \times R_1 - S_N \times G(f) \times R_2 - EC(S_{out}))$$
$$= E_{ind}(f) \times (S_{in} + S_M \times R_1 - S_N \times G(f) \times R_2 -$$
$$EC(AGC(S_M - S_N \times G(f))))$$

whereupon without balancing out the user's hearing impairment, the equalizer function $E_{ind}(f)$ is set to 1.

Figure 2:
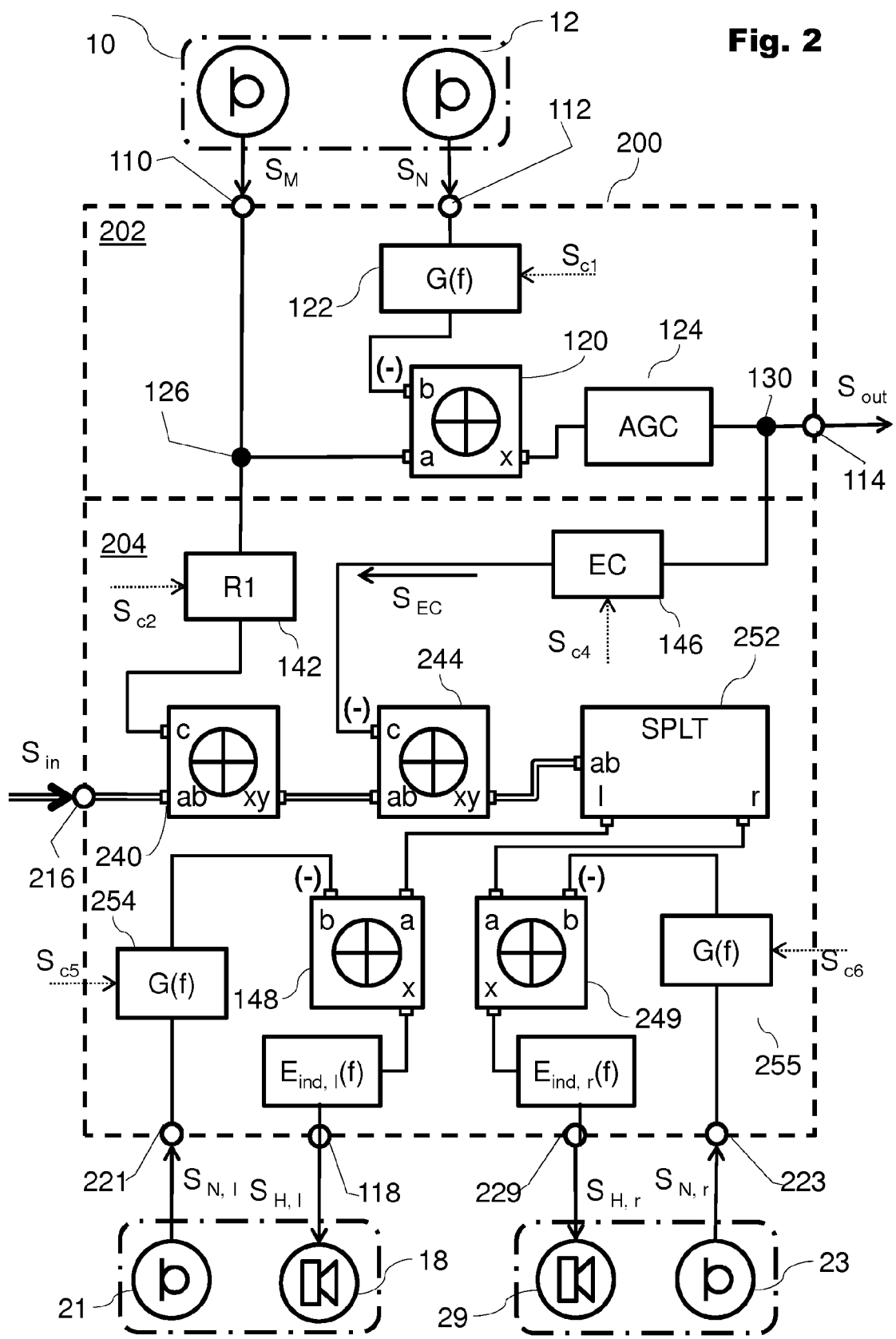
FIG. 2 is a block diagram to illustrate the signal flows and signal processing steps according to a second exemplary embodiment of this invention.

FIG. 2 shows a second exemplary embodiment of this invention in the form of a schematic block diagram to illustrate the signal flows and signal processing steps. This exemplary embodiment can be considered a variation of the first exemplary embodiment, which is why components of the second exemplary embodiment that have already been described in the first exemplary embodiment are assigned the same reference numbers, and are described in less detail unless a more detailed description is helpful to aid comprehension. With regard to the same elements, reference can also be made to the explanations in the first exemplary embodiment.

According to the diagram in FIG. 2, a signal processing block 200 has a transmitting end 202 and a receiving end 204. As in the first exemplary embodiment, on the transmitting end 102, a voice signal $S_M$ is received from a voice microphone 10 via a microphone input 110 and an ambient signal $S_N$ is received from an ambient microphone 12 via a microphone input 112, and a transmission signal $S_{out}$ is output via a transmission signal output 114. To differentiate between other ambient microphones and ambient signals that will be described below, the ambient signal $S_N$ will hereinafter be considered the general ambient signal $S_N$, and the ambient microphone 12 will be considered the general or global ambient microphone 12. As in the first exemplary embodiment, the general ambient signal $S_N$ is subjected to an attenuation function G(f) by the attenuator 112 with characteristics that can be influenced by a control signal $S_{c1}$, and then fed to the negative input b of the adder 120 to be subtracted from the voice signal $S_M$ there, and the output of the adder 120 will be output—after applying the automatic gain control 124—as the transmission signal $S_{out}$ at the transmission signal output 114 to a communication network not shown in detail here.

On the receiving end 204, a received signal $S_M$ is received from the communication network via the received signal input 216, whereupon the received signal $S_{in}$, in contrast to the first exemplary embodiment, is a stereo received signal, including a left and right channel, and the received signal input 216 is therefore also designed as a stereo input.

The stereo received signal $S_{in}$ is first fed to an adder 240, which differs from the adder 140 in the first exemplary embodiment in that it has a stereo input ab, an addition input c, and a stereo output xy. The addition takes place in a way that the signal present at the addition input c is added to both channels of the stereo signal present at the stereo input ab. As described, the received signal $S_{in}$ received via the received signal input 216 on the receiving end 204 is present at the stereo input ab. As in the first exemplary embodiment, the attenuated voice signal, attenuated through the attenuator 142 by the attenuation factor $R_1$ that can be influenced by the control signal $S_{c2}$, is present at the addition input c of the adder 240. Thus, an output signal $S_{in}+S_m \times R_1$ is present at the output xy of the adder 240, which is fed to a stereo input ab of another adder 244.

The adder 244 differs from the adder 144 from the first exemplary embodiment only in its stereo design. Thus, along with its stereo input ab, it also has a negative input c and a stereo output xy. As in the first exemplary embodiment, the echo compensation signal $S_{EC}=EC(S_{out})$ generated by the echo compensator 146 is fed to the negative input c of the adder 244. In contrast with the first exemplary embodiment, in this exemplary embodiment, the characteristics of the echo compensator 146 can also be influenced by another control signal $S_{c4}$. Thus, there is an echo-compensated addition signal $S_{in}+S_M \times R_1-EC(S_{out})$ at the output xy of the adder 244, which is fed to a stereo input ab of a splitter 252.

The splitter 252 separates the stereo received signal present at the input ab into separate mono outputs l and r, which are then processed in separate signal paths. There is a processing path emanating from output l for a left listening channel, and a processing path emanating from output r for a right listening channel.

In addition, along with the speaker output 118 that has a left listening signal $S_{H,l}$ for the speaker 18, which is considered the left speaker 18 here, the receiving end 204 of the signal processing block 200 in this exemplary embodiment also has another speaker output 229, where a right listening signal $S_{H,r}$ is present for a right speaker 29. A left ear sound microphone 21, and a right ear sound microphone 23 are also included. A signal generated by the left ear sound microphone 21 is received in the signal processing block at the left microphone input 221 as a left ear signal $S_{N,l}$, and fed to an attenuator 254. The attenuator 254 provides an attenuation function $G_l(f)$. The characteristics of the attenuation function $G_l(f)$ can be influenced by a control signal $S_{c5}$. Likewise, a signal generated by the right ear sound microphone 23 is received at a right microphone input 223 as the right ear signal $S_{N,r}$, and fed to an attenuator 255, where it is subjected to an attenuation function $G_r(f)$, with characteristics that can be influenced by another control signal $S_{c6}$. The left and right ear signal $S_{N,l}$, $S_{N,r}$ can—to differentiate from the general ambient signal $S_N$—also be considered the left and right specific ambient signal $S_{N,l}$, $S_{N,r}$. The microphone input 112 can also be considered the general ambient microphone input 110 or the general ambient signal input 110; the left and right microphone input 221, 223 can also be considered the left/right ear signal input 221, 223, the left/right specific microphone input 221, 223, the left/right specific ambient signal input 221.

If the received signal $S_{in}$ is considered a combined signal with the parts $S_{in,l}$, $S_{in,r}$ for the left and right channel, according to the description above, a left echo-compensated addition signal $S_{in,l}+S_M \times R_1-EC(S_{out})$ is present at the left output l of the splitter 252, and a right echo-compensated addition signal $S_{in,r}+S_M \times R_1-EC(S_{out})$ is present at the right output r of the splitter 252. The left echo-compensated addition signal is then fed to the first input of the adder 148, which corresponds to the adder 148 of the first exemplary embodiment. Likewise, the right echo-compensated addition signal is fed to a first input a of another adder 249, which matches the adder 148 in design.

On the left side, the left ear signal $S_{N,1} \times G_1(f)$ attenuated by the attenuator 254 is now fed to the negative input of the adder 148, and as described in the first exemplary embodiment, the output signal of the adder 148 will optionally be fed to a custom equalizer for the left ear $E_{ind,l}(f)$ which balances out any hearing impairment of the left ear. The output of the optional equalizer or the output 148 will then be fed to the speaker output 118 as the (here: left) listening signal $S_{H,l}$. Similarly, on the right side, the right ear signal $S_{N,r} \times G_r(f)$ attenuated by the attenuator 255 is fed to a negative input b of the adder 249, and a signal present at an output x of the adder 249 is optionally fed to a custom equalizer for the right ear or $E_{ind,r}(f)$ which balances out any hearing impairment of the right ear. The output of the optional equalizer or the output 249 is then fed as the right listening signal $S_{H,r}$ to the microphone output 229.

As can be seen in the above description, the left listening signal $S_{H,l}$ can be expressed with the following formula:

$$S_{H,1} = E_{ind,1}(f) \times (S_{in,1} + S_M \times R_1 - EC(S_{out}) - S_{N,1} \times G_1(f))$$
$$= E_{ind,1}(f) \times (S_{in,1} + S_M \times R_1 - EC(AGC(S_M - S_N \times G(f))))$$

and the right listening signal $S_{H,r}$ can be expressed with the following formula:

$$S_{H,r} = E_{ind,r}(f) \times (S_{in,r} + S_M \times R_1 - EC(S_{out}) - S_{N,r} \times G_r(f))$$
$$= E_{ind,r}(f) \times (S_{in,r} + S_M \times R_1 - EC(AGC(S_M - S_N \times G(f))))$$

whereupon without balancing out the hearing impairment of the left and/or right ear, the functions $E_{ind,l}(f)$ and/or $E_{ind,r}(f)$ are set to 1. Balancing out the hearing impairment of the left and/or right ear provides for improved localization of a noise, like a car, for example, which improves the comprehensibility of speech.

As indicated by the dash-dotted lines in FIG. 2, the voice microphone 10 and the general ambient microphone 12 are structurally combined in this embodiment. This can be, but is not limited to being, in the form of a double microphone with opposite directional characteristics. In addition, the speaker 18 and the left ear sound microphone 21 are structurally combined, and the right speaker 29 and the right ear sound microphone 23 are structurally combined. This type of structural unity can be, but is not limited to being, integrated in a headphone cup on the corresponding side or in an earpiece in the form of an earplug or an earmold, whereupon an emission direction for the speaker 18, 29 is each directed at one ear of the wearer, and a directional characteristic of the ear sound microphone 21, 23 is directed away from the wearer's ear.

In the first as well as the second exemplary embodiment, each of the elements shown in the signal processing block 100, 200 can be interpreted as components (circuitry, wiring, solder points, etc.) of a physically realized circuit arrangement or as a processing step of a signal processing procedure.

Figure 3:
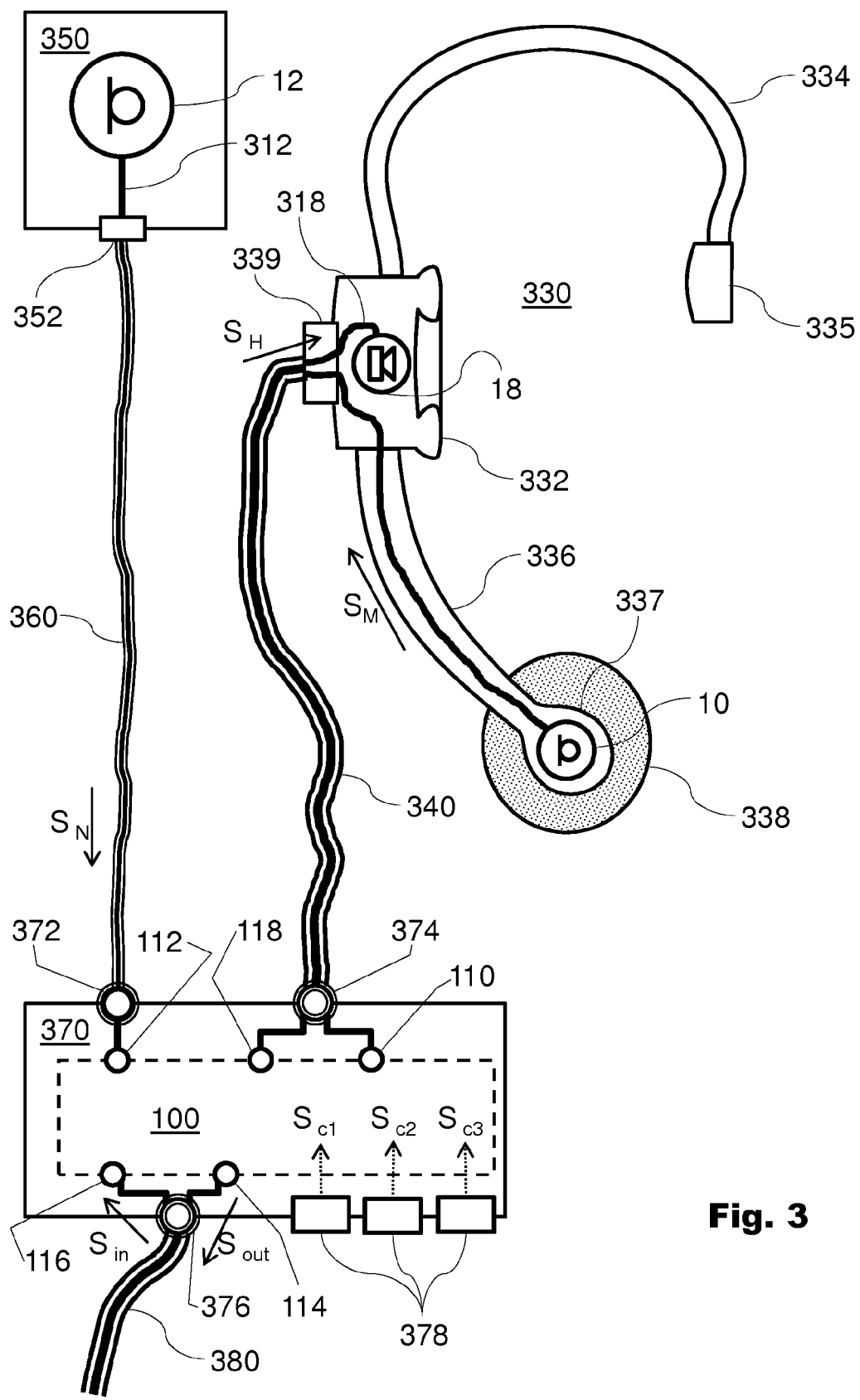
FIG. 3 is a schematic diagram of a headset according to a third exemplary embodiment of this invention.

FIG. 3 shows a third exemplary embodiment of this invention, where the signal processing block 100 of the first exemplary embodiment is used with a headset 330 within the scope of a conference system.

In detail, according to the diagram in FIG. 3, a headset 330 includes an earpiece 332, a headband 334, and a pressure piece 335, where the speaker 18 (see also FIG. 1) is located in the earpiece 332. Out of the earpiece 332 protrudes a microphone arm 336 with a microphone mount 337 at its end where the voice microphone 10 (see also FIG. 1) is located. The microphone mount 337 is surrounded by a windscreen or pop filter 338. A speaker wire 318 connected to the speaker 18, and a microphone wire 310 connected to the voice microphone 10 extend through a strain relief 339 attached to the outside of the earpiece 332, and continue as wires of a headphone cable 340. The headset 330 is designed so the earpiece 332 rests against one ear of the wearer of the headset 330, while the pressure piece 335 rests above the opposite ear of the wearer against the head, and the earpiece 332 and the pressure piece are pressed against the head of the wearer from the pressure of the headband 334, holding the headset 330 to the head of the wearer. The earpiece 332 can be of open or closed design. The microphone arm 336 stretches along the cheek of the wearer of the headset 330 to the mouth so the voice microphone 10 is located in the vicinity of the speaker's mouth to clearly capture the speech of the wearer of the headset 330. The pop filter 338 insulates against disruptive wind noise or heavily aspirated utterances that are often overemphasized by a microphone, and it can be made of a foam material, for example. The pop filter 338 is removable and can be replaced for hygienic reasons if the headset 330 is used by multiple wearers.

A microphone housing 350 is located in the vicinity of the headset 330, either on a wall or on a desk or the like, for example. The microphone housing 350 houses the ambient microphone 12 (see also FIG. 1) and is arranged to record ambient noise that can also reach the voice microphone 10 of the headset 330, while not recording the voice sound of the wearer of the headset 330 or only recording it at a much lower level than through the voice microphone 10. An ambient signal wire 312 is connected to the ambient microphone 12, which stretches through a strain relief 352 on the microphone housing 350, and continues through a microphone cable 360.

The speaker wire 318, the microphone wire 310, and the ambient signal wire 312 all terminate in a switch box 370. More precisely, the microphone cable with the ambient signal wire 354 is connected to a cable connector 372 of the switch box 370, and the headphone cable with the microphone wire (also considered the voice wire) 310 and the speaker wire 318 is connected to a cable connector 374 of the switch box 370. In addition, a conference connection cable 380 with a transmitting wire and a receiving wire (neither shown in detail here) is connected to a cable connector 376 of the switch box 370.

As shown in FIG. 3, the switch box 370 accepts the signal processing block 100 of the first exemplary embodiment (see FIG. 1), which can also be considered a signal processing circuit 100. Here, the microphone input 112 of the processing block 100 is connected to the cable connector 372 of the switch box 370, the microphone input 110 and the speaker output 118 of the processing block 100 are connected to the cable connector 374 of the switch box 370, and the transmission signal output 114 and the received signal input 116 are connected to the cable connector 376 of the switch box 370. Consequently, a voice signal $S_M$, generated in the voice microphone 10, can be transmitted to the switch box 370 via the microphone wire 310, a listening signal $S_H$ can be transmitted from the switch box 370 to the speaker 18 via the speaker wire 318, an ambient signal $S_N$, generated in the ambient microphone 12, can be transmitted to the switch 55 box 370 via the ambient signal wire 354, and a transmission signal $S_{out}$ can be transmitted from the switch box 370 to an external location (not shown in detail here) and a received signal $S_{in}$ can be transmitted from the external location to the switch box 370 via the conference connection cable 380.

In addition, the switch box 370 has three control dials 378 that generate control signals $S_{c1}$, $S_{c2}$, and $S_{c3}$ upon being rotated or based on their position. The control signals $S_{c1}$, $S_{c2}$, and $S_{c3}$ are routed to the signal processing block 100 via terminals that are not shown in detail here.

The signal processing block 100 with its inputs and outputs 110, 112, 114, 116, and 118, the voice microphone 10, the ambient microphone 12, the speaker 18, and the signals $S_M$, $S_H$, $S_N$, $S_{in}$, $S_{out}$, $S_{c1}$ through $S_{c3}$ fully correspond in meaning, design, and effect to the diagrams and descriptions with relation to the first exemplary embodiment as per FIG. 1, such that their descriptions there can be referenced in their entirety.

As can be seen in FIG. 1, the signal processing block 100 generates the transmission signal $S_{out}$ according to the following formula:

$$S_{out}=\text{AGC}(S_M-S_N\times G(f))$$

and the listening signal $S_H$ according to the following formula:

$$S_H=S_{in}+S_M\times R_1-S_N\times R_2\times G(f)-\text{EC}(S_{out})).$$

In other words, the voice signal $S_M$ recorded via the voice microphone 10 is processed into the transmission signal $S_{out}$ by subtracting the ambient signal $S_N$ generated by the ambient microphone 12 and attenuated with a suitable attenuation function $G(f)$ from the voice signal $S_M$, and lastly subjecting the result to an Automatic Gain Control (AGC). On the other end, the received signal $S_{in}$ is processed into the listening signal $S_H$ by adding the voice signal $S_M$, corrected with a suitable attenuation or amplification factor $R_1$, to the received signal $S_{in}$, and removing the ambient signal $S_N$ with suitable attenuation, whereupon echo compensation is also designed in such a way that the transmission signal $S_{out}$ on this end is subtracted from the received signal $S_{in}$ after the appropriate delay and attenuation, in order to suppress any echo effects of the transmission signal $S_{out}$ from this end in the received signal $S_{in}$.

This provides the user or wearer of the headset 330 with an acceptable auditory impression of his or her own voice, even in a loud environment. In the process, the ambient noise and his or her own voice can be attenuated differently (the voice can also be amplified) based on the situation, so the ambient noise does not have to be completely muted for the wearer. Otherwise, the wearer can use the control dial to attenuate the ambient noise to the extent that it essentially doesn't distract from the conversation.

The headset 330 according to this exemplary embodiment can be used for a variety of applications, like according to the description above for teleconferencing or in a conference system with a variety of participants. However, the application is not limited to this; rather, it also includes applications on a headset for cellular phones or a radio, for the workstation of a simultaneous interpreter, a sport commentator in a stadium or another sports venue, a journalist or correspondent in a loud environment or comparable situations, a speaker/translator booth, a broadcast vehicle, a switchboard, etc.

The earpiece 332 can be noise isolating, and an earmuff can be included at the pressure piece 335 or in place of it. In this case, the described arrangement is also suitable for use in a very loud environment like a helicopter or aircraft cockpit, construction equipment or the like, in loud industrial environments, in nightclubs, etc.

In a variation, a speaker can be included at the second ear, so a single-channel received signal $S_{in}$ can be heard the same in both ears, or a stereo received signal $S_{in}$ can be divided among the two ears/speakers after being processed as described.

In place of cable connections 340, 360, 380, wireless connections like Bluetooth, infrared, ultrasound, or other wireless standards can be used.

The switch box 370 can include an arrangement of multiple signal processing blocks 100 to process signals from a variety of conference participants. Here, the received and transmission signal terminals 114, 116 can be connected to a conference control module that can be considered a communication network.

Figure 4:
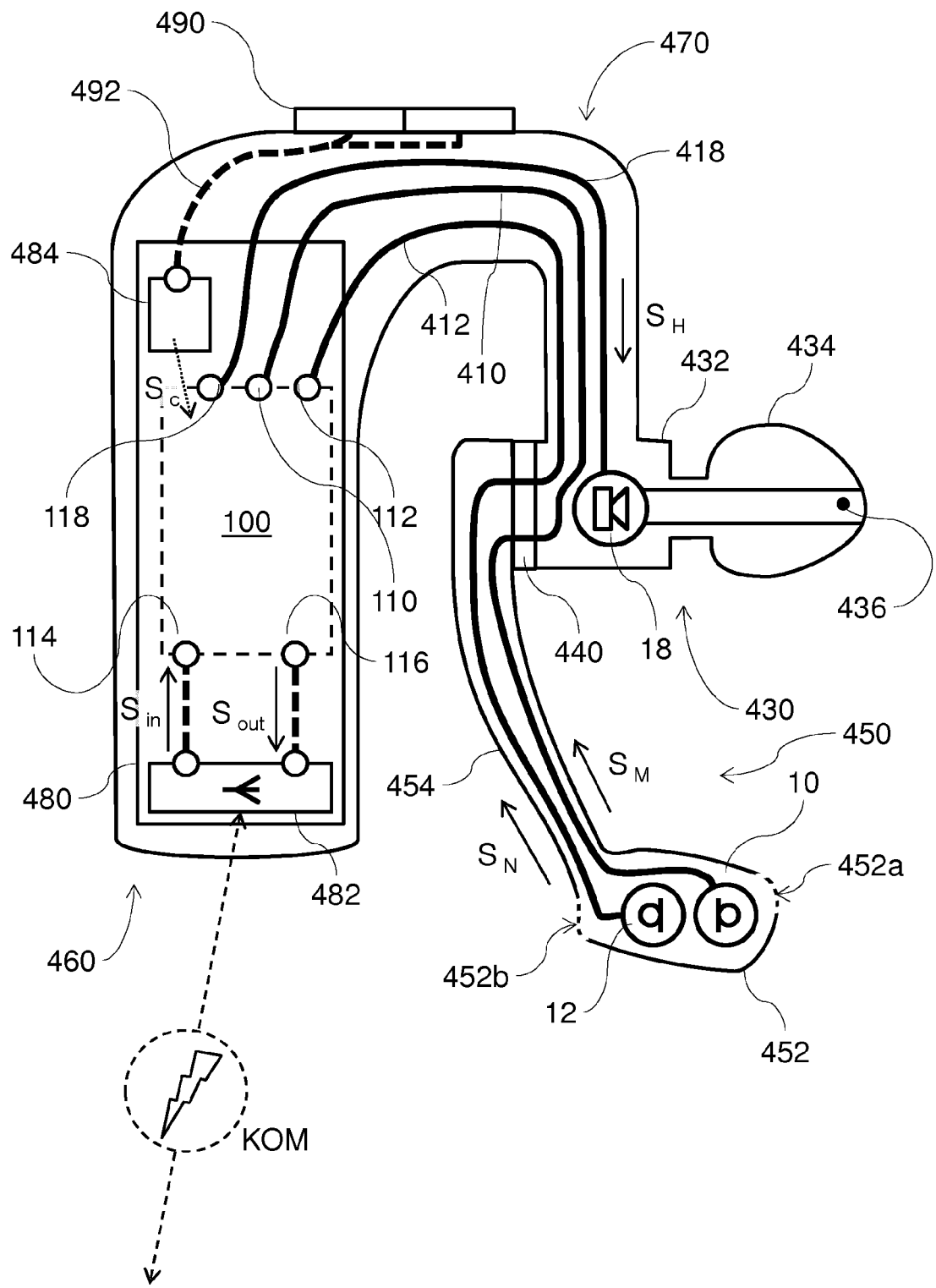
FIG. 4 is a schematic diagram of a radio headset according to a fourth exemplary embodiment of this invention.

As a fourth exemplary embodiment of this invention, FIG. 4 shows a radio headset 400 with a compact or concealed design that can be used with a cell phone, a radio, or hands-free equipment that is not shown in detail here. This radio headset has the signal processing block 100 and all of the other elements of the first exemplary embodiment according to FIG. 1 built-in.

The headset 400 has an earpiece 430 with a housing 432 and an ear adapter 434, whereupon the housing 432 holds the speaker 18, and whereupon the ear adapter 434 is designed to insert into the ear canal of the ear of the person wearing the headset 400. An air duct 436 stretches from the speaker 18 in the housing 432 through the ear adapter 434 so the sound waves emitted by the speaker 18 can be transmitted unobstructed to the ear canal of the wearer.

A microphone arm 450 can swivel via a hinge 440 connected to the housing 432 of the earpiece 430. The microphone arm 450 has a microphone mount 452 and an arm 454 that connects the microphone mount 452 to the hinge 440. The microphone mount 452 holds the voice microphone 10 and the ambient microphone 12. The wall of the microphone mount 452s features perforations or cut-outs 452a, 452b that make it easier for sound to get to the voice microphone 10 or the ambient microphone 12. The voice microphone 10 and the ambient microphone 12 are designed as a double-microphone unit with opposite directional characteristics (i.e., opposite sound acceptance directions). The perforations 452a, 452b are positioned at least approximately along a continuation of the sound acceptance directions of the microphones 10, 12, and they aid their directivity. The sound acceptance direction of the voice microphone 10 and the associated perforations 452a are facing the anticipated mouth position of the wearer of the headset 400, while the sound acceptance direction of the ambient microphone 12 and the associated perforations 452b are facing the opposite direction. This arrangement also ensures that the voice microphone 10 favorably captures the voice sound of a wearer of the headset 400 (including ambient noise, naturally), while the ambient microphone 12 captures the ambient sound, but the voice sound of the wearer is specifically faded out or shielded from this microphone.

The headset also has a rear earpiece 460 and a connecting piece 470. The connecting piece 470 connects the rear earpiece 460 with the earpiece 430. The connecting piece 470 and the rear earpiece 460 are designed so the rear earpiece 460 can be worn comfortably behind the ear of the wearer, while the connecting piece 470 stretches above the ear or rests against a top edge of the ear when the earpiece 430 is placed in the wearer's ear. Incidentally, without limiting their universality, the earpiece 430, the connecting piece 470 and the rear earpiece 460 are design to be one piece.

The rear earpiece 460 includes a switch module 480, which has an antenna block 482, a control signal block 484, and the signal processing block 100. The antenna block 482 is designed and equipped to send and receive signals via a radio interface with a receiver like a cell phone or other device mentioned above. A radio connection from the antenna block 482 to a receiver is represented by a dashed line and labeled KOM.

The signal processing block 100 is shown in detail in FIG. 1, and its design, function, and operation have already been described in relation to the first exemplary embodiment. The microphone input 110 of the signal processing block 100 is connected to the voice microphone 10 via a voice signal wire 410 so a voice signal $S_M$ generated by the voice microphone 10 is present at the microphone input 110 of the signal processing block 100. The microphone input 112 of the signal processing block 100 is connected to the ambient microphone 12 via an ambient signal wire 412 so an ambient signal $S_N$ generated by the ambient microphone 12 is present at the microphone input 112 of the signal processing block 100. The listening signal output 118 of the signal processing block is connected to the speaker 18 via a listening signal wire 418 so a listening signal $S_H$ output via the speaker output 118 of the signal processing block 100 is transmitted to the speaker 18. The received signal input 116 and the transmission signal output 114 of the signal processing block 100 are connected to the antenna block 482 of the switch module 480 so received and transmission signals $S_{in}$, $S_{out}$ can be exchanged between the signal processing block 100 and the antenna block 482.

As shown in FIG. 4, a button panel 490 with multiple buttons is included on the top of the connecting piece 470. The buttons on the button panel 490 are available to the wearer to operate the headset 400 without having to take the headset 400 off. Pressing the buttons on the button panel 490 allows the wearer to send control signals $S_c$ to the switch module 480. The control signals $S_c$ include both control signals $S_{c1}$ through $S_{c3}$ to influence the characteristics of the attenuators 122, 142, 150 (see FIG. 1) of the signal processing block 100, and control signals to initiate or terminate radio communication via the antenna block 482 and to increase or decrease the overall signal strength of the listening signal $S_H$, whereupon certain control signals can also be sent via the antenna block 482 to the receiver, like a cell phone, etc. to conveniently trigger control processes there.

Processing the voice signal $S_M$ to the transmission signal $S_{out}$ and processing the received signal $S_{in}$ to the listening signal $S_H$ correspond to the processing procedures described in relation to the first and the third exemplary embodiments, such that these can be referenced from this point in this respect.

Figure 5:
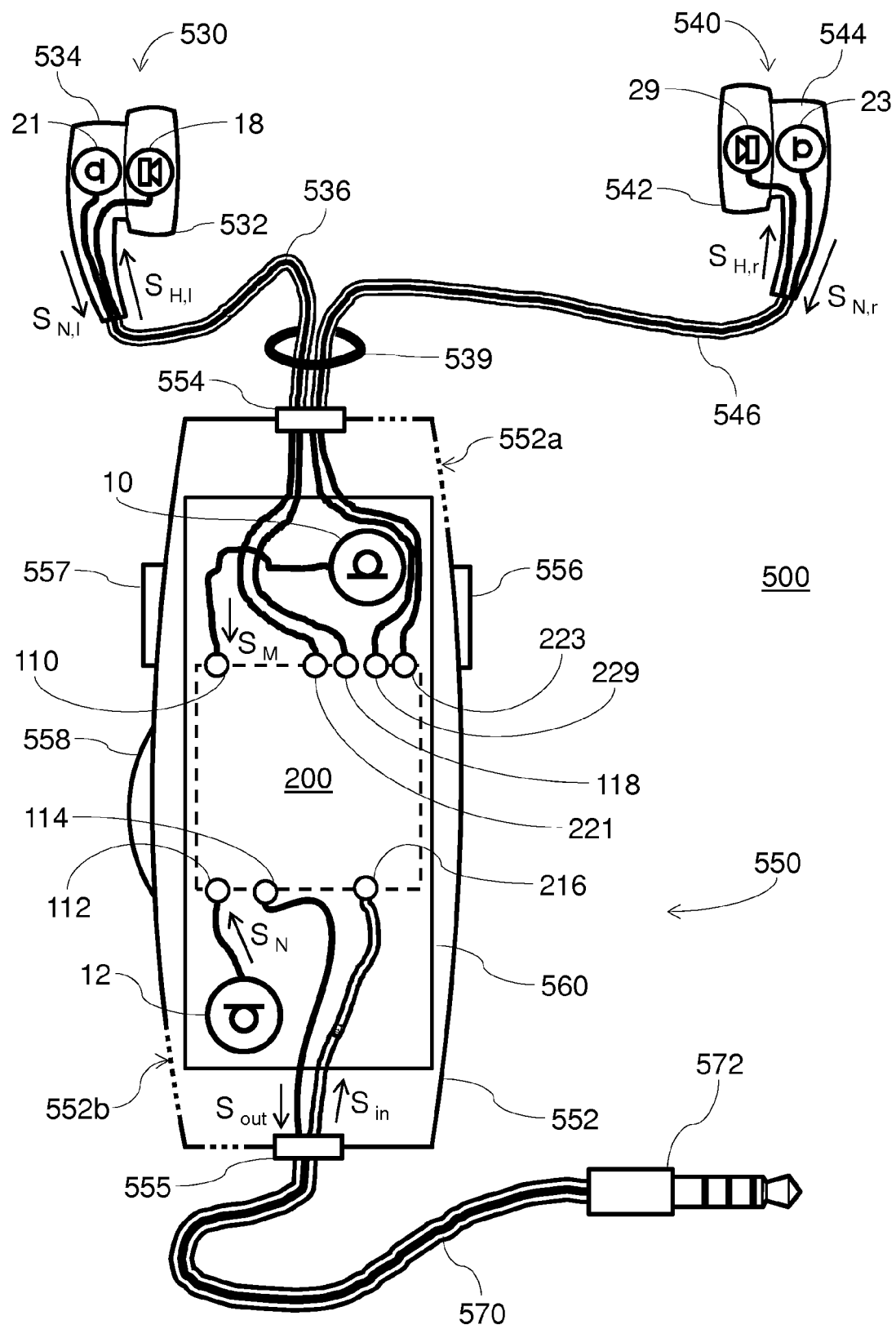
FIG. 5 is a schematic diagram of a stereo headset according to a fifth exemplary embodiment of this invention.

As a fifth exemplary embodiment of this invention, FIG. 5 shows a stereo headset 500 that can be used with a cell phone, a radio, or hands-free equipment that is not shown in detail here. This headset has the signal processing block 200 and all of the other elements of the second exemplary embodiment according to FIG. 2 built-in.

The stereo headset 500 includes a left listening unit 530, a right listening unit 540, and a voice unit 550. The voice unit 550 includes a housing 552, which holds the control board 560. The control board 560 bears the signal processing block 200. Microphones 10, 12, 21, 23 and speakers 18, 23 (see also FIG. 2) are distributed among the voice unit 550 and the listening units 530, 540 as described below.

The left listening unit 530 includes an earpiece 532 that can be inserted into the (left, according to the design) ear canal of the ear of the person wearing the stereo headset 500, and a grip 534 integrated into the earpiece 532 by design, which can be grabbed from the outside when the earpiece 532 is inserted in the ear canal. The left listening unit 530 houses the (left) speaker 18 and the left ear sound microphone 21. A left earpiece cable 536 stretches between a grommet-like extension of the grip 534 on the left listening unit 530 and a strain relief 554 on the voice unit 550. The left earpiece cable 536 includes a speaker wire that connects the left speaker 18 with the speaker terminal 118 on the signal processing block 200, and a microphone wire that connects the left ear sound microphone 21 with the microphone terminal 221 on the signal processing block 200, so a left ear signal $S_{N,l}$ generated by the left ear sound microphone 21 can be fed to the microphone input 221 of the signal processing block 200, and a left listening signal $S_{H,l}$ generated by the signal processing block 200 can be fed from the left speaker output 118 to the left speaker 18.

Likewise, the right listening unit 540 includes an earpiece 542 and a grip 554, and the right speaker 29 and the right ear sound microphone 23 are housed in the right listening unit 540. A right earpiece cable 546 stretches between a grommet-like extension of the grip 544 on the right listening unit 540 and a strain relief 554 on the voice unit 550. The right earpiece cable 546 includes a speaker wire that connects the right speaker 29 with the speaker terminal 229 on the signal processing block 200, and a microphone wire that connects the right ear sound microphone 23 with the microphone terminal 223 on the signal processing block 200, so a right ear signal $S_{N,r}$ generated by the right ear sound microphone 23 can be fed to the microphone input 223 of the signal processing block 200, and a right listening signal $S_{H,r}$ generated by the signal processing block 200 can be fed from the right speaker output 229 to the right speaker 29. The left earpiece cable 536 and the right earpiece cable 546 are collected together in a bundling ring that surrounds the cables 536, 546 tightly, but still allows movement.

On the control board 560 inside the voice unit 550, the voice microphone 10 and the ambient microphone 12 are fastened such that the voice microphone 10 is located near housing cut-outs or perforations 552a at the top end of the housing 552 and the general ambient microphone 12 is located near housing cut-outs or perforations 552b at the bottom end of the housing 552. These microphones 10, 12 are arranged such that their sound acceptance directions point toward the respective perforations 552a, 552b. This arrangement also ensures that the voice microphone 10 favorably captures the voice sound of a wearer of the headset 500 (including ambient noise, naturally), while the ambient microphone 12 captures the ambient sound, but the voice sound of the wearer is specifically faded out. The voice microphone 10 is connected directly to the microphone input 110 of the signal processing block 200 via a wire, and the ambient microphone 12 is connected directly to the microphone input 112 of the signal processing block 200 via a wire so a voice signal $S_M$ generated by the voice microphone 10 is fed to the microphone input 110, and the general ambient signal $S_N$ is fed to the microphone input 112.

A connection cable 570 is fed into the voice unit 550 via a strain relief 555 on the voice unit 550. The connection cable 570 has a single-wire output line connected to the transmission signal terminal 112 of the signal processing block 200, and a two-wire received signal line connected to the stereo received signal terminal 216 of the signal processing block 200. The connection cable 570 ends in a plug 572 that, without limiting its universality, is a four-pin jack. A four-pin jack is very common for use with stereo headsets, and it can be wired with a left input signal at the tip, a right input signal at the contact ring directly next to the tip, an output signal at the second or third contact ring, and a ground at the remaining contact ring. This allows the connection cable 570 to exchange the two-channel received signal $S_{in}$ and the transmission signal $S_{out}$ with a receiver (not shown in detail here), according to the description in the second exemplary embodiment.

As shown in FIG. 5, the voice unit 550 has two buttons 556, 557 and an adjustment wheel 558, which are all accessible on the side of the housing 552. The buttons 556, 557 and the adjustment wheel 558 are designed to be used by the wearer of the headset 500. Actuations or adjustment positions of the buttons 556, 557 and the adjustment wheel 558 are interpreted by a control signal block (not shown in detail here) that is mounted on the control board 560, and converted into control signals $S_c$ that can be fed to the signal processing block 200. The control signals $S_c$ include the control signals $S_{c1}$ through $S_{c6}$ to influence the characteristics of the attenuators 122, 142, 254, 255 (see FIG. 2) and the echo compensator 146 of the signal processing block 200 according to the description in the second exemplary embodiment. In addition, control signals can also be generated for a connection control block (not shown in detail here) to initiate or terminate radio communication and control signals for an amplifier block (not shown in detail here) to increase or decrease the overall signal strength of the listening signal $S_{H,l}$, $S_{H,r}$, and/or control signals that can be sent via the connection cable 570 to the receiver, like a cell phone, etc., to conveniently trigger control processes there.

Design and functionality of the signal processing block 200, the microphones 10, 12, 21, 23 and the speakers 18, 29, as well as the effects that they can achieve were shown in FIG. 2, and described in detail in the context of the second exemplary embodiment. The depiction and description of these in the second exemplary embodiment as per FIG. 2 can be referenced in their entirety. In particular, the voice signal $S_M$ is processed to convert it into the transmission signal $S_{out}$, whereupon the processing can be expressed with the following formula:

$$S_{out}=\text{AGC}(S_M - S_N \times G(f))$$

and the received signal $S_{in}$ is processed to convert it into the left and right listening signal $S_{H,l}$ and $S_{H,r}$, whereupon the processing can be expressed by the following formulas:

$$S_{H,l}=S_M \times R_1 - \text{EC}(S_{out}) - S_{N,l} \times G_l(f)$$

and $$S_{H,r}=S_{in,r}+S_M \times R_1 - \text{EC}(S_{out}) - S_{N,r} \times G_r(f)$$

This invention was described and illustrated in drawings above using preferred exemplary embodiments. However, it must be noted that this invention is solely defined by the independent patent claims, and the above exemplary embodiments, variations, and refinements are only provided as exemplary illustrations. Not all of the elements described above are completely necessary for the application and execution of this invention to the extent that they are not covered in at least one independent claim as a mandatory feature. In place of variability, one or all of the attenuators and the echo compensators can have fixed preset characteristics. The signal inputs can be assigned to input amplifiers, and the listening signal outputs can be assigned to output amplifiers.

For the purposes of this invention, the signal processing blocks 100, 200 each correspond to a procedure or a mechanism for controlling voice communication of a first person with at least a second person via a communication network; the transmitting end 102, 202 each corresponds to a step of the procedure of generating a transmission signal by processing a voice signal; the transmitting end 104, 204 each corresponds to a step of the procedure of generating a listening signal by processing the received signal; the ambient signal $S_N$ corresponds to a general ambient signal; the left and right ear signal $S_{N,l}$ and $S_{N,r}$ correspond to a specific ambient signal; the voice microphone 10 corresponds to a first microphone; the microphone input 110 corresponds to a step of the procedure to receive a voice signal; the transmission signal output 114 corresponds to a step of the procedure of transmitting the transmission signal to the communication network; the received signal input 116, 216 corresponds to a step of the process of receiving a received signal from the communication network; the speaker output 118, 229 corresponds to a step of the procedure of transmitting the listening signal to a speaker; the branching points 126, 128, 130 correspond to a step of the procedure of branching; the adders 120, 140, 144, 240, 244, 148, 249 correspond to a step of the procedure of adding signals (or subtracting signals if a signal input of the adder is negative); the attenuators 122, 142, 150, 254, 255 correspond to a step of the procedure of subjecting a signal to attenuation or amplification; the echo compensator 146 corresponds to a step of the procedure of subjecting a signal to echo compensation; the microphone input 112 corresponds to a step of the procedure of receiving a general ambient signal; The (general) ambient microphone 12 corresponds to a second microphone; the ear sound microphones 21, 23 correspond to a third microphone; the microphone inputs 221, 223 correspond to a step of the procedure of receiving a specific ambient signal; and the control signals represent a variability of attenuation, amplification, or delay properties.

In additional variations of this invention not shown in the drawings, to compensate for the ambient signal in the listening signal, the ambient signal (general ambient signal) $S_N$ in FIG. 1 can be tapped before the attenuator 122, the received signal in FIG. 1 can also be a stereo received signal, and the described processing can affect both channels, the (mono) received signal in FIG. 1 can be distributed among two speakers after the described processing, the received signal in FIG. 2 can also be a mono received signal that can be processed into a single listening signal or a two-channel listening signal by the described procedure, and so forth.

The characteristics of the invention described in reference to the illustrated embodiments can also be present in other embodiments of the invention, unless otherwise indicated or intrinsically prohibited for technical reasons.

LIST OF REFERENCE NUMBERS AND SYMBOLS

10 Voice microphone
12 (General) ambient microphone
18 Speaker, single or left
21 Ear sound microphone (specific ambient microphone), left
23 Ear sound microphone (specific ambient microphone), right
29 Speaker, right
100, 200 Signal processing block
102, 202 Transmitting end
104, 204 Receiving end
110, 112, 221, 223 Microphone inputs
114 Transmission signal output
116, 216 Received signal input
118, 229 Speaker outputs
122 Attenuator G(f)
120, 144, 148, 249 Adder, subtracting
140, 240 Adder, adding
124 Automatic Gain Control (AGC)
146 Echo compensator
142 Attenuator R1
150 Attenuator R2
252 Splitter (SPLT)
254 Attenuator, left channel $G_l(f)$
255 Attenuator, right channel $G_r(f)$
310 Voice signal wire
312 Ambient signal wire
318 Listening signal wire
330 Headset
332 Earpiece
334 Headband
335 Pressure piece
336 Microphone arm
337 Microphone mount
338 Windscreen/pop filter
339 Strain relief
340 Headphone cable
350 Microphone housing
352 Cable bushing
360 Microphone cable
370 Switch box
372-376 Cable connectors
378 Control dial
380 Conference connection cable
400 Headset
410 Voice microphone wire
412 Ambient microphone wire
418 Speaker wire
430 Earpiece
432 Housing
434 Ear adapter
436 Air duct
440 Hinge
450 Mouthpiece
452 Microphone mount
452a, 452b Perforation
454 Arm
460 Rear earpiece
470 Connecting piece
480 Switch module
482 Antenna block
484 Control signal block
490 Button panel
492 Control signal wire
500 Headset
530 Listening unit, left
532 Earpiece
534 Grip
536 Earpiece cable, left
539 Bundling ring
540 Listening unit, right
542 Earpiece
544 Grip
546 Earpiece cable, right
550 Voice unit
552 Housing
552a, 552b Perforation
554, 555 Cable bushing (strain relief)
556, 357 Button
558 Adjustment wheel
560 Control board
570 Connection cable
572 Plug
a, b, ab Signal inputs
x Signal output
AGC Automatic Gain Control
EC Echo Cancellation
$G(f), G_l(f), G_r(f)$ Attenuation function
$R_1, R_2$ Attenuation values
$S_c, S_{c1}$-$S_{c6}$ Control signals
$S_{EC}$ Echo compensation signal $S_H$ Listening signal
$S_{H,l}$ Listening signal, left
$S_{H,r}$ Listening signal, right
$S_{in}$ Received signal
$S_M$ Voice signal
$S_N$ (General) ambient signal
$S_{N,l}$ Ear signal (specific ambient signal), left
$S_{N,r}$ Ear signal (specific ambient signal), right
$S_{out}$ Transmission signal The above list of reference numbers and symbols is an integral part of the description.

What is claimed is:

1. A method for controlling voice communication of a first person with at least a second person via a communication network comprising:
   receiving a voice signal from a first microphone, which converts vocal utterances from the first person to the voice signal;
   generating a transmission signal by processing the voice signal;
   transmitting the transmission signal to the communication network;
   receiving a received signal from the communication network;
   generating a listening signal by processing the received signal; and
   transmitting the listening signal to a speaker that converts the listening signal to an acoustic signal to be perceived by the first person,
   wherein the processing of the received signal to generate the listening signal comprises:
      branching the voice signal and adding the branched voice signal to the received signal;
      branching the transmission signal to create a branched transmission signal;
      subjecting the branched transmission signal to a variable echo compensation to generate an echo compensation signal matching an anticipated echo of the transmission signal contained in the received signal; and
      subtracting the echo compensation signal from the received signal to generate the listening signal.

2. The method of claim 1 also comprising subjecting the branched voice signal to at least one of variable attenuation and amplification before adding the branched voice signal to the received signal.

3. The method of claim 1 also comprising:
   receiving a general ambient signal from a second microphone that is arranged in an environment where the first person is located, and exhibits different sound acceptance characteristics than the first microphone; and
   processing of the voice signal to generate the transmission signal by subtracting the general ambient signal from the voice signal.

4. The method of claim 3 also comprising subjecting the general ambient signal to variable attenuation before subtracting the general ambient signal from the voice signal.

5. The method of claim 3 wherein the first microphone has a first sound acceptance direction and the second microphone has a second sound acceptance direction, the second sound acceptance direction being different from the first sound acceptance direction.

6. The method of claim 3 wherein the processing of the received signal to generate the listening signal comprises:
   branching the general ambient signal; and
   subtracting the branched general ambient signal from the received signal.

7. The method of claim 6 also comprising subjecting the branched general ambient signal to variable attenuation before subtracting the branched general ambient signal from the received signal.

8. The method of claim 3 wherein the voice signal is generated and the general ambient signal is received at essentially a same location.

9. The method of claim 8 where the essentially a same location is near a mouth of the first person, the first microphone has a first sound acceptance direction and the second microphone has a second sound acceptance direction, the second sound acceptance direction being different from the first sound acceptance direction.

10. The method of claim 1 also comprising receiving a specific ambient signal from a third microphone, which is near an ear of the first person ear, and is closer to the first person's ear than the second microphone and wherein the processing of the received signal to generate the listening signal comprises subtracting an ambient signal from the received signal.

11. The method of claim 10 wherein the ambient signal is subjected to variable attenuation before the subtraction.

12. The method of claim 10 also comprising generating the listening signal through the speaker and the ambient signal through the third microphone at essentially a same location, wherein the speaker and the third microphone both have a same sound acceptance direction.

13. The method of claim 10 also comprising processing the received signal separately for each ear of the first person.

14. The method of claim 13 wherein:
   the speaker comprises a first speaker is assigned to a first ear of the first person, and a second speaker is assigned to a second ear of the first person;
   the listening signal comprises a first listening signal which is emitted at the first speaker and a second listening signal which is emitted at the second speaker;
   the third microphone comprises a first third microphone and a second third microphone; and
   the specific ambient signal comprises a first specific ambient signal generated by the first third microphone, and a second specific ambient signal generated by the second third microphone.

15. The method of claim 14 wherein the first specific ambient signal is variably attenuated and subtracted from the received signal to generate the first listening signal.

16. The method of claim 14 wherein the second specific ambient signal is variably attenuated and subtracted from the received signal to generate the second listening signal.

17. A communications system comprising
   a first microphone configured to receive vocal utterances from a first person and convert those utterances to a voice signal;
   a first processor connected to the first microphone, the first processor configured to receive the voice signal and generate a transmission signal by processing the voice signal;
   a transmitter connected to the first processor, the transmitter configured to transmit the transmission signal via a network;
   a receiver configured to receive a signal input from the network and output a received signal based on the received signal input from the network;
   a second processor connected to the receiver, the second processor configured to receive the received signal and generate a listening signal by processing the received signal; and a speaker that is connected to the second processor, the speaker configured to receive the listening signal and convert the listening signal to an acoustic signal to be perceived by the first person, wherein the second processor is configured such that the processing of the received signal by the second processor to generate the listening signal comprises:

adding the voice signal branched to the second processor to the received signal to form the listening signal such that the vocal utterances from the first person are includable within the acoustic signal;

branching the transmission signal to create a branched transmission signal;

subjecting the branched transmission signal to a variable echo compensation to generate an echo compensation signal matching an anticipated echo of the transmission signal contained in the received signal; and subtracting the echo compensation signal from the received signal to generate the listening signal.

18. The communication system of claim 17 also comprising a speaking/listening unit that contains the speaker, the speaking/listening unit selected from the group consisting of a radiotelephone helmet, a headset, a concealed headset, an earphone, a hearing aid device and a speaker phone.

19. A communication device comprising:

a first microphone configured to receive vocal utterances from a user and convert those utterances to a voice signal;

a first processor connected to the first microphone, the first processor configured to receive the voice signal and generate a transmission signal by processing the voice signal;

a transmitter connected to the first processor, the transmitter configured to transmit the transmission signal to a network;

a receiver configured to receive an input signal from the network and output a received signal;

a second processor connected to the receiver, the second processor configured to receive the received signal and generate a listening signal by processing the received signal, the processing of the received signal comprising:

adding the voice signal to the received signal such that vocal utterances from the user are obtainable from the generated listening signal, branching the transmission signal to create a branched transmission signal;

subjecting the branched transmission signal to a variable echo compensation to generate an echo compensation signal matching an anticipated echo of the transmission signal contained in the received signal, and subtracting the echo compensation signal from the received signal to generate the listening signal; and a speaker connected to the second processor, the speaker configured to receive the listening signal and convert the listening signal to an acoustic signal to output the acoustic signal such that the acoustic signal is perceivable by the user such that the vocal utterances are hearable by the user via the acoustic signal.

* * * * *